United States Patent [19]

Diehl et al.

[11] 4,116,419
[45] Sep. 26, 1978

[54] LIMITED FLOAT SEAT CONSTRUCTION FOR EXPANDING GATE VALVE

[75] Inventors: Robert J. Diehl, Vivian, La.; Robert C. Houlgrave, Houston, Tex.

[73] Assignee: ACF Industries, Incorporated, New York, N.Y.

[21] Appl. No.: 844,251

[22] Filed: Oct. 21, 1977

[51] Int. Cl.² .................................................. F16K 3/00
[52] U.S. Cl. ...................................... 251/196; 251/328; 251/361; 251/363
[58] Field of Search .............. 251/196, 328, 167, 363, 251/361

[56] References Cited

U.S. PATENT DOCUMENTS

| 3,006,601 | 10/1961 | Anderson | 251/328 X |
|---|---|---|---|
| 3,301,523 | 1/1967 | Lowrey | 251/328 X |
| 3,743,244 | 7/1973 | Dickenson | 251/328 X |

Primary Examiner—Harold W. Weakley
Attorney, Agent, or Firm—Eugene N. Riddle

[57] ABSTRACT

A limited float or controlled float seat assembly for a gate valve with a transversely expandable gate assembly has generally L-shaped annular seat retainers fixed in recesses around the valve inlet and outlet flow passageways and generally L-shaped annular seat members mounted in a complementary relation within each of the seat retainers. The seat retainers each have an inturned lip opposite to and spaced from the end of the recess. The inturned lips form limit stops for the seat members. The seat members have an outturned lip which contacts the inturned lip of the seat retainer thereby limiting movement of the seat member when the seat member moves to an extended position. The combined amount of float for both seat members is less than the total expansion of the gate assembly from a collapsed position to an expanded position where it seals with the seat members so that drag of the seat members on the gate assembly is minimized.

6 Claims, 4 Drawing Figures

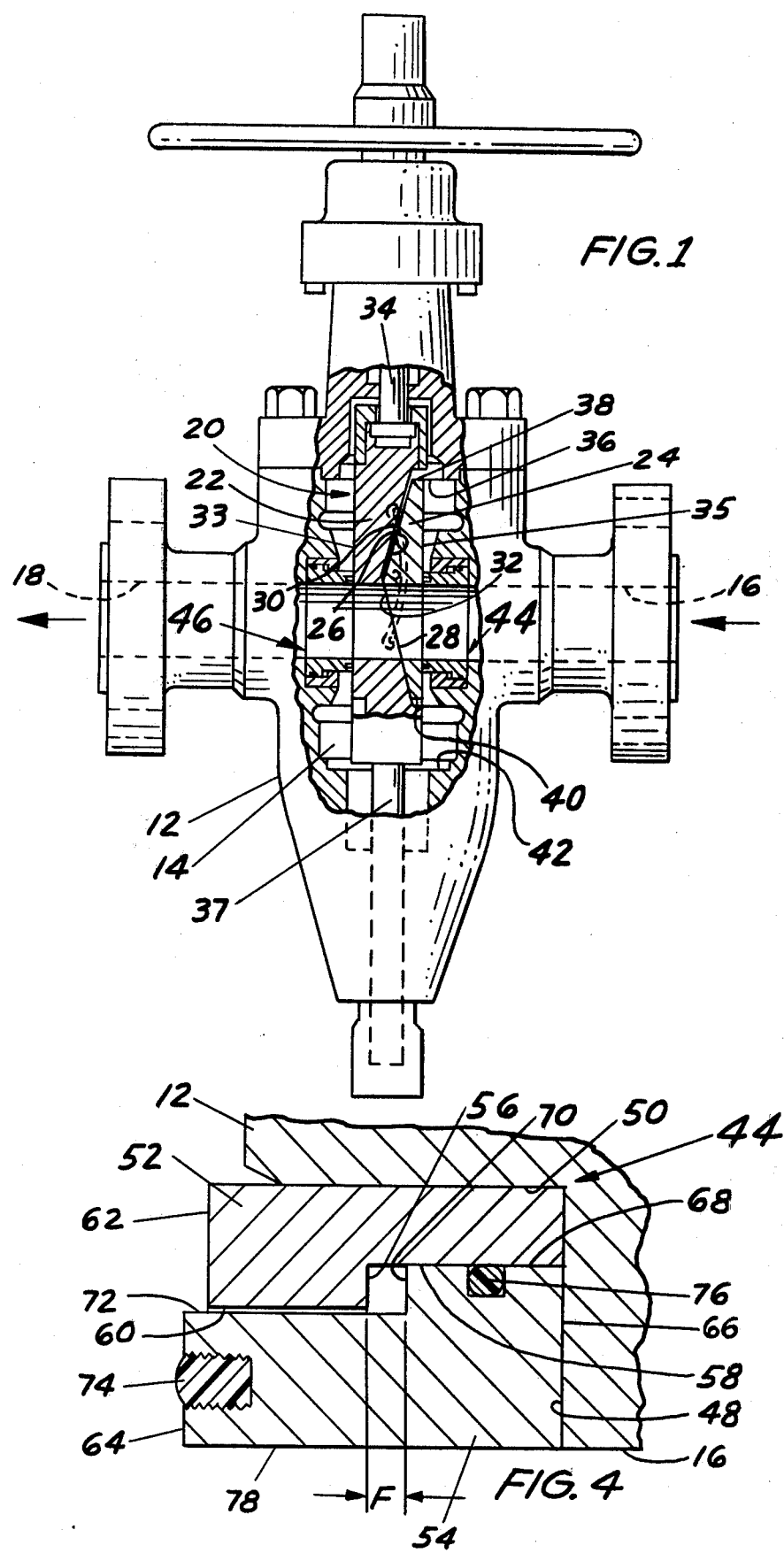

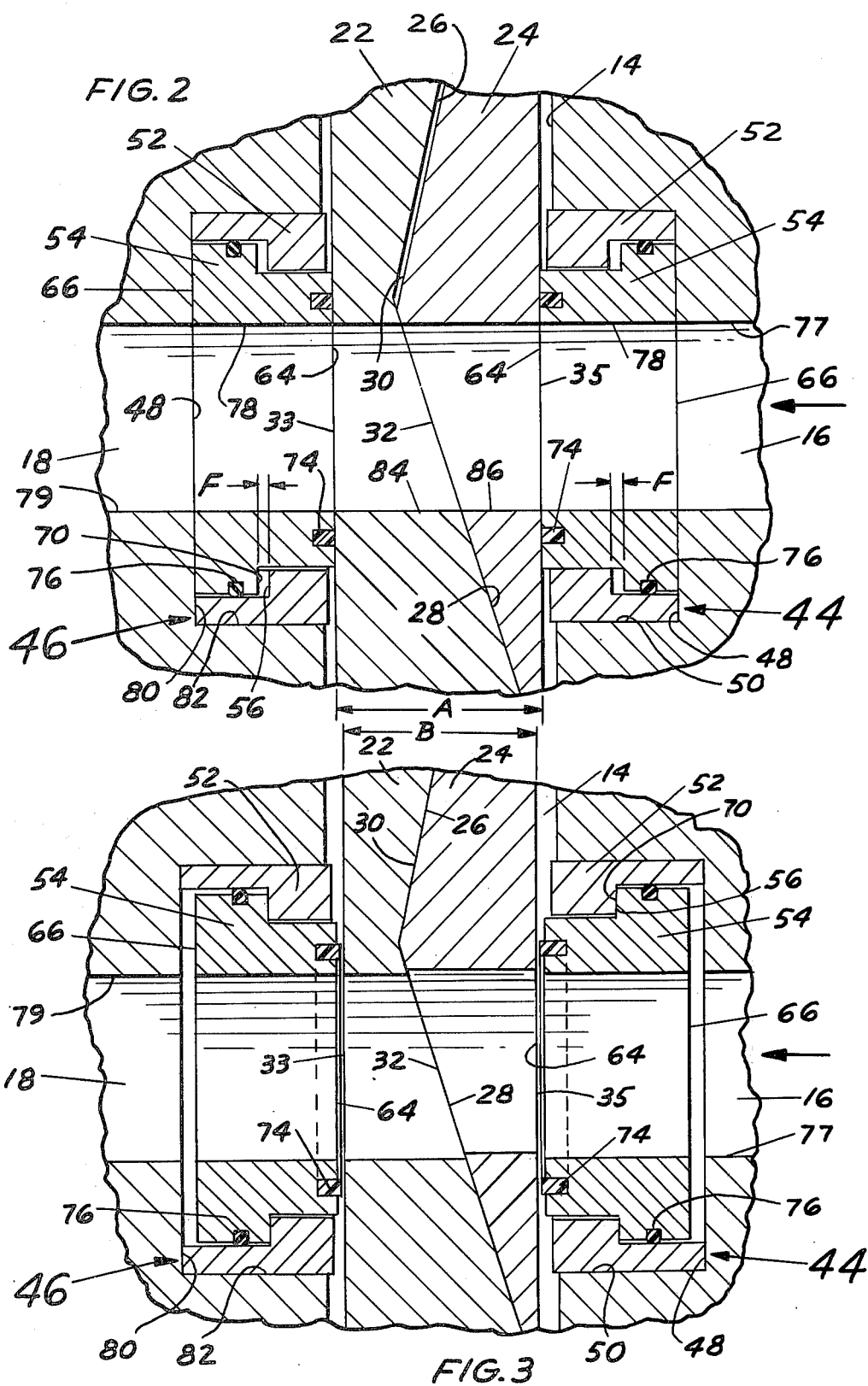

LIMITED FLOAT SEAT CONSTRUCTION FOR EXPANDING GATE VALVE

BACKGROUND OF THE INVENTION

This invention is related to a seat assembly for a valve having an expanding gate assembly and employing a floating type seat assembly. More specifically, this invention is related to expanding gate valves wherein the gate assembly has a gate member and an attached segment member and outer sides of the gate assembly are substantially parallel and expand outwardly in a parallel relation in both the open position and the closed position.

In the prior art the seats for this expanding type gate valve are generally pressed into the valve body in recesses around the flow passageways at the valve chamber so that theoretically the seat will be in a fixed position. Ideally the seats provide essentially parallel surfaces for the gate to contact when it is in the expanded configuration regardless of whether the gate is in the open position or the closed position. As a practical matter, however, the seats are not always fixed and they can float or move inward toward the gate assembly under high differential pressure conditions. In doing this the seats move to a position tight against the gate assembly and drag excessively on it thus making the valve very difficult to open or close. The other construction used with this type of valve is a floating seat arrangement wherein the seat member is designed to float in the seat pocket generally in the direction of the flow passageway so that it can be moved against the gate sides by the fluid pressure. The disadvantage of this type design is that excessive drag is always created between the seat members and the gate assembly when the gate assembly is moved due to the upstream seat being forced against the gate assembly by fluid pressure at all times. This is a particularly serious problem in high pressure service applications because large forces are needed on the gate to move it in order to overcome the drag forces of the seats. The advantage in the floating seat design is that the sealing surfaces of the seats will easily align with the sealing surfaces of the gate because of clearances that provide for the floating action of the seats, therefore, less wedging pressure in required of the expanding gate assembly to seal the valve. Heretofore, no practical seat construction has been known for parallel sided expanding gate valves which will take advantage of the easy sealing characteristics of the floating seat design yet not have the excessive drag disadvantage which is inherent of the design.

SUMMARY OF THE INVENTION

In an embodiment of the limited float seat assembly of this invention a seat retainer is mounted in a seat recess around a flow passageway of an expanding type gate valve at the valve chamber thereof. The retainer has an inturned lip forming an inner annular abutment which acts as a limit stop for the seat member. A seat member is mounted inside the opening of the seat retainer and provided with a face seal to contact the gate member. The seat member has an outturned lip forming an outer annular abutment which contacts the seat retainer inner annular abutment when the seat moves to an extended position thereby limiting the floating motion of the seat member. The valve is constructed with a parallel sided gate assembly having a gate member and a slidably mounted attached segment wherein the gate assembly expands outwardly to contact seat members when the gate assembly is in the open position and the closed position.

One object of this invention is to provide a seat structure for an expanding gate valve which overcomes the aforementioned disadvantages of the prior art seat constructions discussed above.

Still, one other object of this invention is to provide a limited float seat assembly for an expanding type gate valve including a seat retainer member fixed in the valve body and a seat member within the seat retainer that is movable only a limited extent when the gate assembly moves between an expanded position and a collapsed position.

Still another object of the invention is to provide a limited float gate valve seat assembly for an expanding type gate valve which limits the floating motion of the seats to a distance less than the total distance of expansion of the gate assembly so that when the gate assembly is in a collapsed position the seat members will not drag excessively on the gate assembly as it is moved between open and closed positions.

Various other objects, advantages, and features of this invention will become apparent to those skilled in the art from the following discussion, taken in conjunction with the accompanying drawings, in which:

DESCRIPTION OF THE DRAWINGS

FIG. 1 is a side elevation view of an expanding gate valve with a central portion thereof shown thereof removed to show the gate assembly and the limited float seat assembly of this invention in both the upstream and downstream seat recesses of the valve. Arrows on this figure show the preferred direction of flow through the valve;

FIG. 2 is an enlarged segmental elevation view of a portion of the gate assembly and the upstream and downstream seat assemblies for the valve shown in FIG. 1 with the gate assembly shown in the open position and in the expanded configuration;

FIG. 3 is an enlarged segmental elevation view similar to FIG. 2 with the gate assembly shown in the collapsed configuration and the seat members both resting against the limit stops of the respective associated seat retainers. An arrow on the figure indicates the preferred direction of flow through the valve; and FIG. 4 is an enlarged cross-sectional elevation view of the upstream seat assembly and a portion of the valve body with the seat member in a fully retracted position.

The following is a discussion and description of a preferred specific embodiment of the seat structure of this invention, such being made with reference to the drawings whereupon the same reference numerals are used to indicate the same or similar parts and/or structure. It is to be understood that such discussion and description is not to unduly limit the scope of this invention.

DETAILED DESCRIPTION

FIG. 1 of the drawings shows a gate valve of the expanding gate type which is equipped with the novel seat construction of this invention. The gate valve includes a valve body 12 with a valve chamber 14 therein and inlet and outlet flow passageways 16 and 18 through the valve body in fluid communication with the valve chamber. An expanding gate assembly indicated generally at 20 is movably mounted in the valve chamber for movement between open and closed positions. The gate assembly 20 includes a gate member 22 and a segment 24 which is attached to one side of the gate member 22. Gate member 22 is provided with a transverse notch across one side thereof forming a pair of inclined surfaces 26 and 28 on the upper and lower sides thereof as shown in FIG. 1. Segment 24 is formed with a pair of inclined surfaces 30 and 32 on one side thereof to fit against notched surfaces 26 and 28 respectively. Gate 22 has an essentially planar outer sealing surface 33 which is the sealing surface for the downstream seat assembly. Segment 24 has an essentially planar outer sealing surface 35 forming the sealing surface for the upstream seat assembly. Gate 22 is moved within the valve chamber by an upper stem 34 secured to the upper end thereof and a lower stem 37. Upper stem 34 is displaced in up and down motion by a handwheel as shown or an appropriate actuator. Segment 24 is held in place on gate 22 by a curved spring shown in dashed lines in FIG. 1 and located on the hidden side of the gate assembly. Segment 24 strikes an upper stop 36 in the valve body with an upper end portion 38 thereof to limit its motion in that direction which in turn causes an outward expansion of gate assembly 20 upon further movement of gate 22 because of the sliding of surfaces 32 and 28. When gate assembly 20 is moved in the opposite direction a lower end portion 40 of segment 24 strikes a lower stop 42 to limit the motion of segment 24 which in turn will cause sliding between surfaces 26 and 30 and expansion of the gate assembly upon continued motion of gate 22.

Valve body 12 is provided with recesses around both the inlet and outlet flow passageways at the valve chamber for mounting of the upstream and downstream seat assemblies 44 and 46 respectively. Seat assemblies 44 and 46 are identical except for their positions in the valve an opposite sides of valve chamber 14. FIG. 4 shows an enlarged view of a portion of upstream seat assembly 44. For purposes of describing details of the seat assembly, only the portion of the upstream seat assembly shown in FIG. 4 will be used. The downstream seat assembly because of its identical structure will not be described in detail separately.

FIG. 4 shows a portion of valve body 12 surrounding the upstream flow passageway 16 and upstream seat assembly 44. The upstream recess is formed by an end wall 48 that extends outward from upstream flow passage 16 generally perpendicular to the longitudinal axis of the flow passageway, and a recess outer wall 50 which extends from end wall 48 to the valve chamber in concentric relation with the upstream flow passage 16. Upstream seat assembly 44 includes an annular seat retainer 52 mounted in the outer portion of the recess and fixed to valve body 12, and an annular seat member 54 mounted within seat retainer 52. Seat retainer 52 has an elongated portion extending from recess end wall 48 along recess outer side wall 50 with an inturned lip portion. This inturned lip portion forms an inner annular abutment 56 which faces recessed end wall 48 and is spaced therefrom. The interior of seat retainer 52 has a larger bore portion 58 joining the end which rests against recess end wall 48 to inner annular abutment 56 and a smaller diameter bore portion 60 extending from the inner perimeter of inner annular abutment 56 to an inner end 62 at the valve chamber. Seat member 54 is also a generally cross-sectionally L-shaped member mounted in a complementary relation to seat retainer 52 including an outward turned lip portion adjacent recess end wall 48 and an elongated portion extending therefrom to a front face 64 which contacts the gate assembly. Seat member 54 has an outer end 66 which will rest against recess end wall 48 when the seat member is in a fully retracted position as shown in FIG. 4. The exterior of seat member 54 includes a larger diameter outer portion 68 extending from outer end 66 to an outer annular abutment 70 at the outturned lip portion. The inner perimeter of outer annular abutment 70 joins one end of a smaller diameter outer portion of the seat member that extends to seat front face 64. A face seal ring 74 is mounted in a groove around seat front face 64 with an exposed portion of the seal ring extending slightly beyond seat front face 64 as shown in FIG. 4. An O-ring 76 is mounted in a groove around the outer perimeter of seat member larger diameter outer portion 68 to provide a fluid-tight seal between the seat member and the seat retainer larger diameter internal bore 58. When seat member 54 is in the fully retracted position as shown in FIG. 4, abutments 56 and 70 are separated by a distance indicated at F. When seat member 54 is in the fully extended position, abutments 56 and 70 are in flush contact.

FIGS. 2 and 3 show the novel improved seat assembly of this invention in its two normal operating positions. Because upstream seat assembly 44 and downstream seat assembly 46 are structurally identical except for their placement in the valve, the same reference numerals are used on both of the seat assemblies for convenience. Upstream seat assembly 44 resides in the upstream recess around inlet flow passageway 16 as defined by recess end wall 48 and recess outer side wall 50. Downstream seat assembly 46 resides in the downstream seat recess around outlet flow passageway 18 with the recess being defined by end wall 80 and outer side wall 82.

Referring to FIG. 2, gate assembly 20 is shown in the open position with gate 22 and segment 24 wedged tightly against the seats. In this position segment sealing surface 35 is in fluid-tight sealing contact with upstream seat front face 64, gate sealing surface 33 is in fluid-tight sealing contact with the downstream seat front face, and the adjoining sealing surfaces 28 and 32 on the gate and segment respectively are in fluid-tight sealing contact. When the gate assembly is in this position the internal bore through the valve is defined by interior bore 77 of inlet flow passageway 16, the upstream seat interior bore 78, the segment interior bore 86, the gate interior bore 84, the downstream seat interior bore 78, and the interior bore 79 of the downstream flow passage 18. These bores are substantially coaxial and of essentially the same diameter so that a substantially smooth passageway is provided through the valve. Also, because seat assembly is in the fully expanded position both upstream and downstream seat members are forced outwardly against their respective recess end walls 48 and 80. In both seat assemblies the distance between the abutting surfaces 70 and 56 is the dimension indicated at F in FIGS. 2 and 4. With the valve in this position, fluid sealing around the flow passageway is created by the metal-to-metal contact between the outer ends of the upstream and downstream seat members and their respective recess end walls, the peripheral seals around the larger diameter portions of the seat members, the face seals of the seat members and the metal-to-metal contact between adjoining surfaces of gate 22 and segment 24. It is to be noted that with the valve in the position shown in FIG. 2, the combined or total thickness of the gate assembly is its maximum normal thickness which is indicated as dimension A in the lower portion of FIG. 2.

Referring to FIG. 3 gate assembly 20 is shown in its fully collapsed position which is the position it assumes when moving between the open position and the closed position or vice versa. In the completely collapsed configuration, segment 24 has inclined surfaces 30 and 32 resting in flush contact with the gate notched surfaces 26 and 28 so the gate assembly is in its thinnest possible configuration with the width dimension thereof indicated at dimension B on the upper portion of FIG. 3. As gate assembly 20 is moved between the expanded configuration and the collapsed configuration, upstream seat member 54 moves with segment 24 or in the downstream direction until seat outer annular abutment 70 contacts recess inner annular abutment 56 whereupon this motion of the upstream seat stops. Motion of the upstream seat in this direction is assisted by fluid pressure acting on the back side of the seat member between recess end wall 48 and seat outer end 66 which tends to force the seat member downstream. As long as face seal 74 is in contact with gate 22 and fluid pressure in the valve chamber is below fluid pressure in the upstream flow passageway 16, then the fluid forces on seat member 54 urge it in the downstream direction toward the limit stop created by seat retainer 52. This action floats the upstream seat member downstream and provides a force to assist collapsing gate assembly 20 by exerting pressure in the upstream side of segment 24 thereby urging it into the notched portion of gate 22. The spring shown in dashed lines in FIG. 1 on the gate assembly also assists in displacing segment 24 into the notched portion of gate 20. The distance which gate assembly 20 collapses is the difference in dimensions A and B, a collapse distance. This collapse distance must be greater than twice the distance F for the seat construction shown in FIGS. 2 and 3 so the face seals can move away from the gate and segment sealing surfaces 33 and 35 respectively. By way of example, for API type valves having an internal bore of between about 2 inches to about 4 inches the distance F for each seat is between about 0.003 of an inch to about 0.007 of an inch and the gate assembly can expand (difference in dimensions A and B) a distance of between about 0.012 of an inch to about 0.025 of an inch.

Once the upstream seat member has reached its limit stop and sealing surface 35 of segment 24 separates from the sealing surface of upstream face seal 74, then the upstream fluid pressure from inlet passageway 16 is transmitted to the valve body cavity. At this time, fluid pressure in upstream passageway 16, valve chamber 14, and downstream passageway 18 are essentially the same at this time. When the gate assembly moves between its normal operating positions, it is in the collapsed configuration as shown in FIG. 3 and the upstream seal ring and seat member do not drag on or contact the upstream side of the gate with any significant degree of friction. The face seal and upstream seat member may be spaced from segment sealing surface 35 or they may contact this surface depending upon the dimensions and tolerances of the parts involved and the amount of transverse (upstream—downstream) movement of gate assembly 20. Preferably, the upstream face seal is spaced from segment sealing surface 35 so the upstream seat will not drag on the gate assembly during movement. However, because of tolerance dimensions of parts and transverse movement of gate assembly 20 the upstream face seal may touch segment sealing surface 35 but not with sufficient force to create a significant drag force on the gate assembly as it moves between its normal operating positions.

On the downstream side of the gate assembly, gate surface 33 may or may not contact the downstream seat member or face seal depending upon the position of gate 22 relative to the downstream seat member. FIG. 3 shows the downstream seat member in contact with gate surface 33 and against the limit stop of the seat retainer. Whether or not the gate contacts the downstream seat depends upon the amount of downstream translation of the gate assembly. This specific amount of downstream translation depends upon whether the valve is a balanced stem type as shown in FIG. 1 or whether it has only one stem. In the balanced stem construction downstream motion of the gate assembly is due to tolerances of the upper and lower stems 34 and 37 in their mounting and the amount of slop or movement in the connection between the stems and the gate member. Obviously, this motion is variable from valve to valve and also depends upon the dimensions of the various parts in a specific valve. Because the downstream seat member can float downstream to some extent, the gate member can also move in the downstream direction and displace the downstream seat member so that the gate member either does not drag or so that any drag on the gate is minimal. When gate assembly 20 is moved to the collapsed position, gate 22 remains essentially stationary and segment 24 moves; therefore, the reduction in gate thickness occurs mostly on the side of the gate assembly having the segment. For this reason, gate surface 33 remains relatively stationary but it will move away from the position shown in FIG. 2 because the wedging pressure on the gate assembly is released. When this occurs the downstream seat member can move in the upstream direction and the downstream face seal can move away from gate surface 33 as shown in FIG. 3. If the downstream face seal moves away from gate surface 33, then drag on the gate assembly due to the downstream seat is removed. If the downstream face seal remains in contact with gate surface 33, then drag on the gate assembly due to the downstream seat member and face seal depends upon the forces urging this seat member toward surface 33 which is minimal because this seat member is free to float in the downstream seat retainer yet is limited in its movement toward the gate assembly.

Normal operation of the gate valve involves moving gate assembly 20 between open and closed positions and expanding gate assembly 20 in both positions. During translation of gate assembly 20 when it reaches substantially the closed position segment lower end 40 contacts lower stop 42 and gate 32 continues moving so the gate is tranversely expanded because of the sliding between gate surface 26 and segment surface 30. Expansion of gate assembly 20 urges the seat members outward to the position shown in FIG. 2, thus sealing the valve in the closed position. When the valve is moved between the closed position and the open position, the gate is moved in the upward direction toward the position shown in FIG. 1 and the upstream seat member is urged toward the gate by fluid pressure in inlet passageway 16 until the limit stop is reached. At this position abutments 56 and 70 of the upstream seat member and the upstream retainer contact and thus further collapsing of gate assembly 20 separates upstream face seal 74 from segment sealing surface 35. When this occurs fluid pressure in valve chamber 14 becomes essentially that of the upstream flow passageway which usually will be greater than the downstream fluid pressure. The gate can then move in the upstream direction and away from the downstream seat member, thus, causing a separation or maintaining only minimal contact between downstream face seal and the gate sealing surface 33. Because of these minimal contacts or clearances, friction on gate assembly 22 as it moves between the closed position and the open position is minimized.

Because of the novel limited float seat construction of this invention, this seat assembly provides a very simple and effective means of reducing the torque or force required to open or close a high pressure gate valve. Although the drawings illustrate both the upstream and downstream seat assemblies as being the novel limited float construction of this invention, it is to be understood that the upstream seat assembly is of primary importance in regard to reducing drag on the gate assembly. Because of this aspect, the novel seat construction of this invention can be used on only the upstream side of a valve if desired and a fixed seat of the conventional style used on the downstream side and with this a substantial reduction in operating torques will be realized. When this arrangement is used, the gate will ride on the fixed downstream seat or move closely adjacent thereto as the gate assembly moves longitudinally while the upstream seat assembly will function as described above and reduce drag on the gate assembly thereby reducing the operation torque of the valve.

What is claimed is:

1. In a gate valve structure having a valve body and a valve chamber therein and inlet and outlet flow passages communicating with the valve chamber, an expanding gate assembly including a gate element and segment slidably mounted together within the valve chamber for movement between open and closed positions of the gate assembly with said gate element and segment expanding away from each other at the fully open and closed positions, and an annular recess in the body around each of said flow passages at said valve chamber and defined by an end wall extending transversely to the longitudinal axis of the associated flow passageway and an outer side wall radially outwardly of the associated flow passageway extending perpendicularly to said end wall; an improved seat assembly comprising:

(a) a generally L-shaped annular seat retainer fixed within each of said recesses and having an inturned lip opposite said recess end wall, said inturned lip having an inner annular abutment facing said end wall to form a limit stop;

(b) a generally L-shaped annular seat member mounted in a complementary relation within each of said seat retainers and adjacent said recess end wall for movement between extended and retracted positions in a direction longitudinally of the associated flow passage and relative to said retainer, said seat member having an outturned lip forming an outer annular abutment facing said inner annular abutment on said seat retainer and contacting said inner abutment at its extended position for limiting the movement of the seat member in said extended position, said seat member having a seal around the outer perimeter thereof to seal against the associated seat retainer ring; and (c) an annular face seal about a front face of each of said seat members to seal against said gate assembly, the combined longitudinal outward movement of both said seat members from a retracted position in contact with said recess end wall to an extended position in contact with said inturned lip being limited to a distance less than the total distance of expansion of said gate assembly to at least around one-half said total expansion of said gate assembly where said total distance of expansion is the distance that said gate element and said segment move away from each other when said gate assembly moves from a collapsed position to an expanded position making a fluid-tight seal against both of said seats in order to minimize drag of said seat members against said gate assembly as said gate assembly is moved between said open and closed positions.

2. The seat assembly of claim 1, wherein:

(a) said seat retainer being in contact with said recess outer side wall and said recess end wall having a large diameter internal bore extending from said recess end wall to said inturned lip, and having a smaller diameter internal bore extending from said inturned lip to an inner end thereof at said valve chamber;

(b) said seat member having a large diameter portion inside said seat retainer large diameter portion and extending from an outer end thereof to said outturned lip, and a small diameter portion extending from said outturned lip to said front face with said small diameter seat portion extending through said seat retainer small diameter portion and said seat front face being spaced beyond said seat retainer when in said retracted position.

3. The seat assembly of claim 2, wherein:

(a) said seal around said seat member has an O-ring mounted in a groove around the outer perimeter of said seat member large diameter portion; and (b) said seat retainer being press fitted into said recess.

4. The seat assembly of claim 1, wherein:

(a) each of said seat members individually moves between about 0.003 inch and about 0.007 inch between the associated recess end wall and limit stop; and (b) said gate element and said segment element have essentially planar outer surfaces which move away from each other a distance of from about 0.012 inch to about 0.025 inch upon movement of said gate assembly from a fully collapsed position to a fully expanded position for a valve having a bore of between about 2 inches to about 4 inches through the seats thereof.

5. In a gate valve structure having a valve body and a valve chamber therein and inlet and outlet flow passages communicating with the valve chamber, an expanding gate assembly including a gate element and segment slidably mounted together within the valve chamber for movement between open and closed positions of the gate assembly with said gate element and segment expanding away from each other at the fully open and closed positions, a downstream seat mounted with said valve body around said outlet flow passage at said valve chamber, and an annular recess in the body around said inlet flow passage at said valve chamber and defined by an end wall extending transversely to the longitudinal axis of said inlet flow passageway and an outer side wall radially outwardly of the inlet flow passageway extending perpendicularly to said end wall; an improved upstream seat assembly comprising:

(a) a generally L-shaped annular seat retainer fixed within said recess and having an inturned lip opposite said recess end wall, said inturned lip having an inner annular abutment facing said end wall to form a limit stop;

(b) a generally L-shaped annular upstream seat member mounted in a complementary relation within said seat retainer and adjacent said recess end wall for movement between extended and retracted positions in a direction longitudinally of the associated flow passage and relative to said retainer, said upstream seat member having an outturned lip forming an outer annular abutment facing said inner annular abutment on said seat retainer and contacting said inner abutment at its extended position for limiting the movement of said upstream seat member in said extended position, said upstream seat member having a seal around the outer perimeter thereof to seal against said seat retainer; and (c) an annular face seal about a front face of said upstream seat member to seal against said gate assembly, the longitudinal outward movement of said upstream seat member from a retracted position in contact with said recess end wall to an extended position in contact with said inturned lip being limited to a distance less than the total distance of expansion of said gate assembly where said total distance of expansion is the distance that said gate element and said segment move away from each other when said gate assembly moves from a collapsed position to an expanded position making a fluid-tight seal against both of said seats in order to minimize drag of both said seat members against said gate assembly as said gate assembly is moved between said open and closed positions.

6. The seat assembly of claim 5, wherein:

(a) said seat retainer is in contact with said recess outer side wall and said recess end wall;

(b) said seat retainer has a large diameter internal bore extending from said recess end wall to said inturned lip, and having a smaller diameter internal bore extending from said inturned lip to an inner end thereof at said valve chamber; and (c) said upstream seat member has a large diameter portion inside said seat retainer large diameter portion, and a small diameter portion extending from said outturned lip to said front face with said small diameter seat portion extending through said seat retainer small diameter portion and upstream seat front face being spaced beyond said seat retainer when in said retracted position.

* * * * *